US012796718B2

(12) United States Patent
Soma et al.

(10) Patent No.: US 12,796,718 B2
(45) Date of Patent: Nov. 17, 2026

(54) CONTINUOUS FERMENTATION PROCESS FOR MEAT CURING AGENTS

(71) Applicant: Florida Food Products, LLC, Eustis, FL (US)

(72) Inventors: Pavan Kumar Soma, Eustis, FL (US); Kelly Cannon, Eustis, FL (US)

(73) Assignee: Florida Food Products, LLC, Eustis, FL (US)

( * ) Notice: Subject to any disclaimer, the term of this patent is extended or adjusted under 35 U.S.C. 154(b) by 413 days.

(21) Appl. No.: 18/422,666

(22) Filed: Jan. 25, 2024

(65) Prior Publication Data

US 2024/0206508 A1 Jun. 27, 2024

Related U.S. Application Data

(62) Division of application No. 17/348,606, filed on Jun. 15, 2021, now Pat. No. 11,918,012.

(60) Provisional application No. 63/038,935, filed on Jun. 15, 2020.

(51) Int. Cl.
*A23L 13/40* (2023.01)

(52) U.S. Cl.
CPC ............ *A23L 13/45* (2016.08); *A23L 13/432* (2016.08)

(58) Field of Classification Search
CPC ......... A23L 13/40; A23L 13/45; A23L 13/432
USPC ............................................................ 426/56
See application file for complete search history.

(56) References Cited

U.S. PATENT DOCUMENTS

| | | | |
|---|---|---|---|
| 1,685,629 | A | 9/1928 | Drake |
| 6,030,520 | A | 2/2000 | Jacek et al. |
| 6,217,925 | B1 | 4/2001 | Kim |
| 2008/0305213 | A1 | 12/2008 | Husgen et al. |
| 2012/0301577 | A1 | 11/2012 | Baublits et al. |
| 2014/0242217 | A1 | 8/2014 | Luxembourg |
| 2021/0386101 | A1 | 12/2021 | Soma et al. |

FOREIGN PATENT DOCUMENTS

| | | | |
|---|---|---|---|
| CN | 102224910 | B | 1/2013 |
| KR | 20180031438 | A | 3/2018 |
| WO | 2013186348 | A1 | 12/2013 |
| WO | 2014089025 | A1 | 6/2014 |

OTHER PUBLICATIONS

International Search Report in PCT International Patent Application No. PCT/US2021/037501 mailed Sep. 17, 2021.

(Continued)

*Primary Examiner* — Subbalakshmi Prakash
(74) *Attorney, Agent, or Firm* — Greenberg Traurig, LLP; Roman Fayerberg; George Banis

(57) ABSTRACT

In some aspects, the present disclosure provides an advantageous process for preparing meat curing agents. In some embodiments, a process for continuous conversion of plant-based nitrates to nitrites includes: inoculating a source material liquid comprised of nitrates with a bacterial culture capable of converting nitrates to nitrites; when nitrites in the source material liquid reach a desired concentration, harvesting a first harvest volume of the source material liquid at a harvest rate; and replenishing the harvested volume of the source material liquid with source material liquid comprising additional nitrates at a feed rate, wherein the harvest rate is higher than the feed rate.

23 Claims, 10 Drawing Sheets

(56) References Cited

OTHER PUBLICATIONS

Mears et al., "A Review of Control Strategies for Manipulating the Feed Rate in Fed-Batch Fermentation Processes", Journal of Biotechnology, vol. 245, pp. 34-46, 2017.

European Search Report in International Application EP 21 82 7000 mailed Jun. 17, 2024.

400

600

601 602 603

800

801 802 803

CONTINUOUS FERMENTATION PROCESS FOR MEAT CURING AGENTS

CROSS-REFERENCE TO RELATED APPLICATION

This application in a divisional patent application of U.S. patent application Ser. No. 17/348,606, filed Jun. 15, 2021, which claims the benefit of and priority to U.S. Provisional Patent Application No. 63/038,935, filed Jun. 15, 2020, the content of each of which is hereby incorporated by reference in their entireties.

FIELD

The present disclosure relates to compositions for curing meat and poultry products, and methods for making such compositions.

BACKGROUND

Curing is a critical preservation technique to preserve meat and poultry products for shelf-life extension, flavor enhancement and color stabilization. All-natural meat and poultry products are cured with fermented plant-based curing agents containing nitrites. Batch fermentation is the commonly used process for producing plant-based fermented curing agents. These processes cannot keep up with the demand for the curing agents as the demand for the all-natural meat and poultry products grows. Accordingly, there is a need for an improved process for the production of plant-based curing agents.

SUMMARY

In some aspects, the present disclosure provides an advantageous process for preparing meat curing agents. In some embodiments, such process for continuous conversion of plant-based nitrates to nitrites comprising: inoculating a source material liquid with a microbial culture, the source material liquid comprising a concentration of nitrates and the microbial culture being capable of converting nitrates in the source material liquid to nitrites; allowing the microbial culture to reach a desired conversion rate to ferment the source material liquid to convert nitrates to nitrites; harvesting a volume of the fermented source material liquid at a first rate; and replacing the volume of the fermented source material liquid with fresh source material liquid at a second rate, wherein the second rate is slower than the first rate.

In some aspects, the present disclosure provides an advantageous process for preparing meat curing agents. In some embodiments, a process for continuous conversion of plant-based nitrates to nitrites includes: inoculating a source material liquid comprised of nitrates with a bacterial culture capable of converting nitrates to nitrites; when nitrites in the source material liquid reach a desired concentration, harvesting a first harvest volume of the source material liquid at a harvest rate; and replenishing the harvested volume of the source material liquid with source material liquid comprising additional nitrates at a feed rate, wherein the harvest rate is higher than the feed rate.

In some embodiments, the process further includes: determining a rate of conversion of nitrates to nitrites; calculating a time for desired conversion (Tconversion) of nitrates to nitrites based on an initial concentration of nitrates in the source material liquid and the rate of conversion; calculating the harvest volume based on a total volume of the source material liquid and Tconversion; and calculating the feed rate based on the harvest volume and a harvest time.

In some embodiments, such process further includes harvesting one or more additional harvest volumes of the source liquid with the desired concentration of nitrites at regular time intervals equal to the harvest time.

In some embodiments, if a concentration of nitrates in the harvest volume is lower than the desired concentration of nitrites, the process further includes decreasing the feed rate, decreasing the harvest volume, or increasing harvest time. In some embodiments, the nitrates in the source material liquid are plant-based nitrates. In some embodiments, the process further includes adjusting an initial concentration of nitrates in the source material liquid. In some embodiments, the rate of conversion of nitrates to nitrates is a maximum conversion rate of nitrates to nitrites for the bacterial culture. In some embodiments, the process further includes adjusting one or more of the harvest volume, harvest rate and feed rate to maintain the maximum conversion rate of nitrates to nitrites. In some embodiments, the process further includes determining a rate of conversion of nitrates to nitrites and allowing the rate of conversion to become a maximum conversion rate of nitrates to nitrites for the bacterial culture before harvesting a first harvest volume.

In some embodiments, the harvested volume of the fermented source material liquid is between 20 and 80% of an initial volume of the source material liquid. In some embodiments, the harvest rate is between 3 and 100 times faster than the feed rate. In some embodiments, the source material liquid has a nitrate concentration of at least 100 ppm. In some embodiments, the source material liquid has a Degrees Brix measurement between 1 and 12. In some embodiments, the desired concentration of nitrites is achieved when at least 85% of nitrates have been converted to nitrites. In some embodiments, the desired harvest time is between 30 minutes and 2 hours. In some embodiments, the harvested volume of the fermented source material liquid is between 40 and 60% of an initial volume of the source material liquid. In some embodiments, the rate of harvest is between 3 and 100 times faster than the feed rate. In some embodiments, the desired conversion rate is the maximum conversion rate. In some embodiments, the volume of the fermented source material is calculated based on the conversion rate and the concentration of nitrates in the source material liquid.

In some aspects, the present disclosure provides a system comprising a fermentation tank configured to hold a source material liquid comprising plant-based nitrates, the fermentation tank having an inlet configured to provide the source material liquid to the fermentation tank and outlet configured to withdraw the source material liquid from the fermentation tank; a processor being programmed to receive a conversion data to monitor conversion of the nitrates to nitrites, when the source material liquid is inoculated with a bacterial culture capable of converting nitrates to nitrites; when nitrites in the source material liquid reach a desired concentration, cause a first harvest volume of the source material liquid to be harvested at a harvest rate; and cause the harvested volume of the source material liquid to be replenished with source material liquid comprising additional nitrates at a feed rate, wherein the harvest rate is higher than the feed rate.

In some embodiments, the processor is further programmed to determine a rate of conversion of nitrates to nitrites; calculate a time for desired conversion (Tconversion) of nitrates to nitrites based on an initial concentration of nitrates in the source material liquid and the rate of conversion; calculate the harvest volume based on a total volume of the source material liquid and T conversion; and calculate the feed rate based on the harvest volume and a harvest time.

In some embodiments, the processor is further programmed, if a concentration of nitrates in the harvest volume is lower than the desired concentration of nitrites, to cause a decrease in the feed rate, cause a decrease in the harvest volume, or cause an increase in harvest time. In some embodiments, the nitrates in the source material liquid are plant-based nitrates. In some embodiments, the rate of conversion of nitrates to nitrates is a maximum conversion rate of nitrates to nitrites for the bacterial culture. In some embodiments, the processor is further programmed to cause an adjustment in one or more of the harvest volume, harvest rate and feed rate to maintain the maximum conversion rate of nitrates to nitrites In some embodiments, the processor is further programmed to determine a rate of conversion of nitrates to nitrites and cause an allowance of the rate of conversion to become a maximum conversion rate of nitrates to nitrites for the bacterial culture before harvesting a first harvest volume. In some embodiments, the harvested volume of the fermented source material liquid is between 20 and 80% of an initial volume of the source material liquid. In some embodiments, the harvest rate is between 3 and 100 times faster than the feed rate. In some embodiments, the source material liquid has a nitrate concentration of at least 100 ppm. In some embodiments, the source material liquid has a Degrees Brix measurement between 1 and 12. In some embodiments, the desired concentration of nitrites is achieved when at least 85% of nitrates have been converted to nitrites. In some embodiments, the harvest time is between 30 minutes and 2 hours.

The present disclosure further provides compositions comprising curing agents, methods of using the instant curing agents to treat meat, poultry, or sea food products, as well as meat, poultry, and seafood products treated by the instant curing agents.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

While the above-identified drawings set forth presently disclosed embodiments, other embodiments are also contemplated, as noted in the discussion. The present disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates generally to methods for producing food additives for the preservation of the meat and seafood. The curing agents produced by the methods of the present disclosure may comprise an amount of nitrite for curing various meats, such as beef, pork, turkey, chicken, products, from such meats, as well as seafood and seafood products. In some embodiments, the curing agents of the present disclosure can be used with organic or all-natural meats, poultry or seafood. Accordingly, it may be desirable that the nitrites in such curing agents are derived from a natural source. In some embodiments, plants that are rich in nitrates may be fermented to convert the nitrates to nitrite using a bacterial culture or enzymes. The present disclosure provides a continuous fermentation (nitrate to nitrite conversion) process, which is more efficient in terms of time and production cost.

Figure 1:
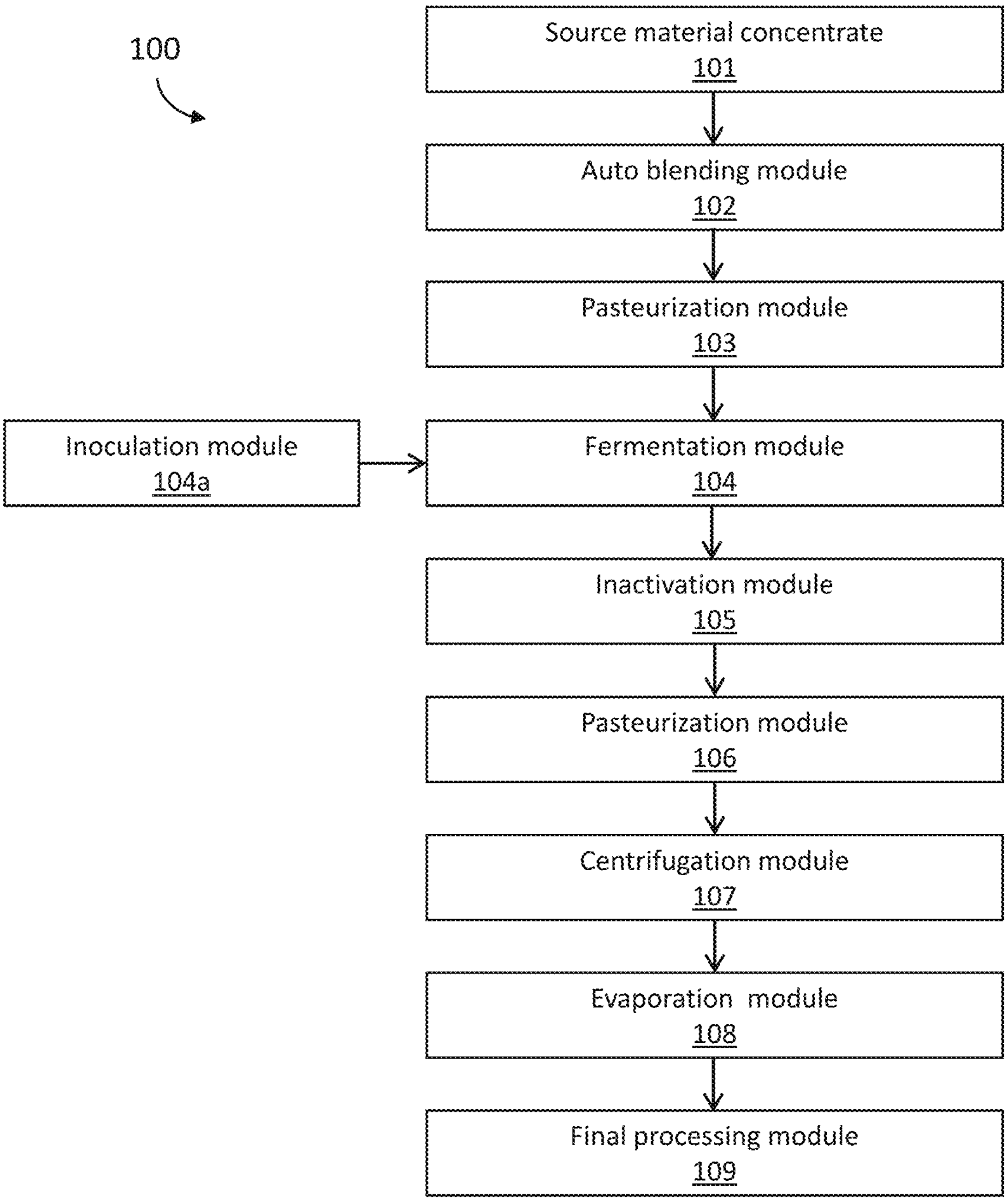
FIG. 1 provides an exemplary system that can be utilized to carry out a continuous fermentation process of the present disclosure FIG. 2 provides an exemplary method of preparing a curing agent of the present disclosure.

FIG. 1 provides a process system 100 that can be utilized to carry out a continuous fermentation process of the present disclosure.

Such system 100 can include one or more individual modules/units of operation: a plant material concentrate preparation module 101, auto blending module 102, pasteurization module 103, fermentation module 104, inoculation 104*a* of source material for fermentation module 104, inactivation module 105, pasteurization module 106, centrifugation module 107, evaporation module 108, and final processing module 109.

Figure 2:
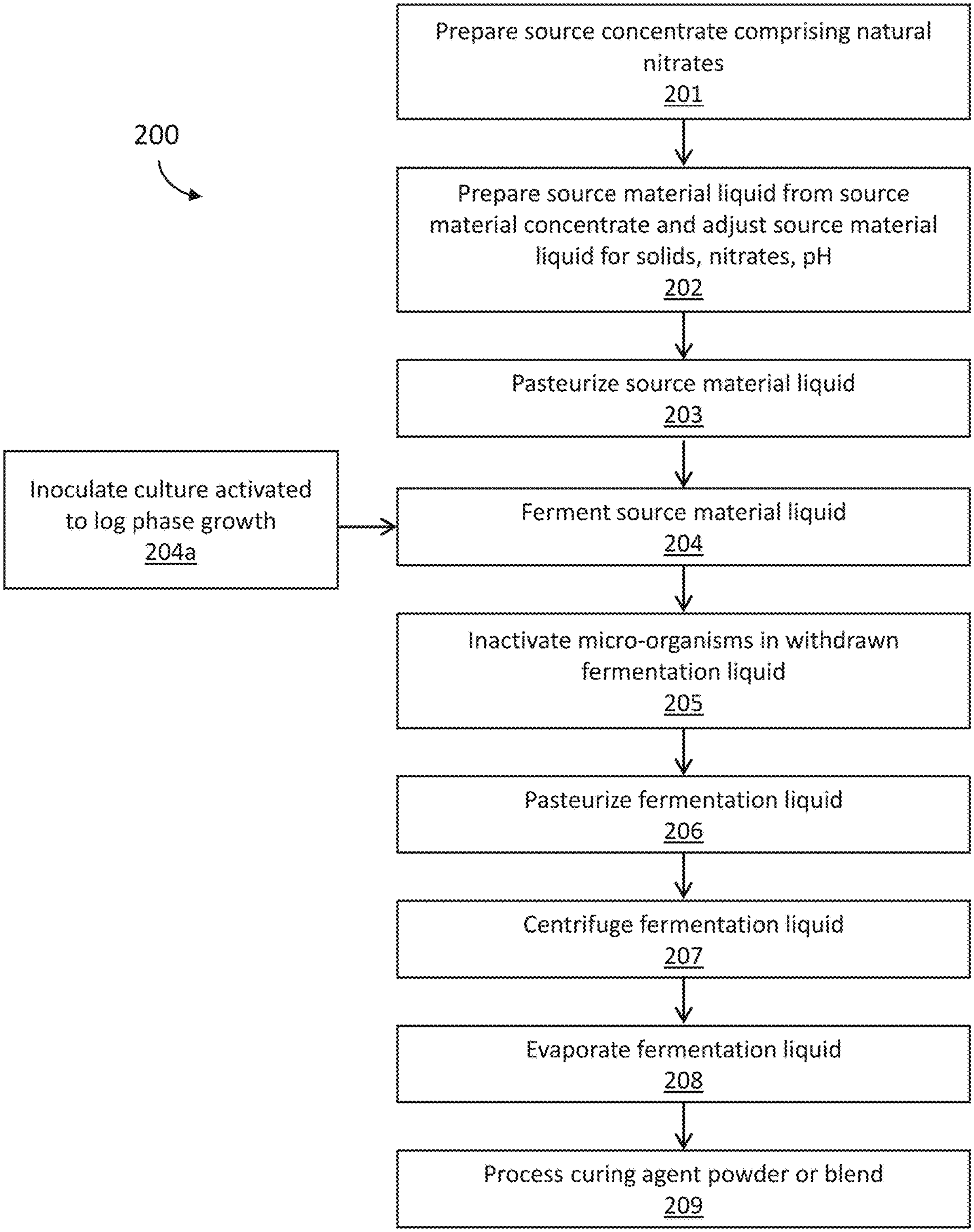

FIG. 2 provides an exemplary method 200 of preparing the curing agent of the present disclosure using system 100. Method 200 includes one or more of preparing source material concentrate comprising natural nitrates 201, adjusting source material concentrate for solids, nitrates, and pH 202, pasteurizing source material concentrate 203, fermenting source material concentrate 204, inoculating source material concentrate with culture activated to log phase growth 204*a*, inactivating micro-organisms in withdrawn fermentation liquid 205, pasteurizing fermentation liquid 206, centrifuging fermentation liquid 207, evaporating fermentation liquid 208, and processing curing agent powder or blend 209.

Step 201 includes preparing a source material that comprises natural nitrates into a source material concentrate,

101. Various nitrate containing plants can be used for the source of nitrates. For example, the source material may be produced, but is not limited to, various forms of lettuces, such as head lettuce, lamb's lettuce, iceberg lettuce, as well as cabbage, spinach, celery, beet, beet greens, swiss chard, cucumber, eggplant, mushroom, green pepper, butternut squash, zucchini, carrot, artichoke, green bean, lima bean, broccoli, cauliflower, collard green, corn, mustard, okra, onion, Chinese pea pod, black eyed pea, green pea, potato, turnip, sauerkraut, radish, other edible plants or combinations thereof.

Source material concentrate 101, can be prepared in step 201 from whole plants or plant parts (leaves, stems, flowers, seeds), processed plants in any form, such as, juice, concentrate or dry powder, or a combination thereof. When using whole plants or plant parts, the plants can be subjected to a physical treatment, such as cutting, macerating, pressing, solid-liquid extractions, concentrating, drying, etc. to prepare the source material concentrate. In some embodiments, the source material concentrate can be prepared from previously processed plants in a form of a vegetable juice, vegetable juice concentrate or powder. In various embodiments, such source materials can have a nitrate concentration of at least 100 ppm, at least 1000 ppm, at least 2000 ppm, at least 5,000 ppm, at least 10,000 ppm, at least 25,000 ppm, at least 50,000 ppm, at least 100,000 ppm, or at least 140,000 ppm. By way of a non-limiting example, the nitrate concentration in the source material can range between about 15,000 ppm and 40,000 ppm.

In step 202, which occurs in auto blending module 102, water is added to the source material concentrate 101 to produce source material liquid, and the resulting solution is automatically adjusted for solids, nitrates and pH.

The source material liquid comprises nitrates in high concentration. In various embodiments, the source material liquid can have a nitrate concentration of at least 100 ppm, at least 1000 ppm, at least 2000 ppm, at least 5,000 ppm, at least 10,000 ppm, at least 25,000 ppm, at least 50,000 ppm, at least 100,000 ppm, or at least 140,000 ppm. By way of a non-limiting example, the nitrate concentration in the source material liquid can range between about 15,000 ppm and 100,000 ppm. In some embodiments, the concentration of nitrates in the source material concentrate 101 can be adjusted to ensure a consistent starting material for the process. For example, the concentrate from the whole plants can be supplemented by a previously prepared concentrate or vegetable juice.

In addition to the concentration of nitrates, the source material liquid can include other soluble solids commonly measured by refractometer in Degrees Brix. Such solids may include solids that naturally occur in the source material, such as, sugars, proteins, and salts. The range for Degrees Brix can be 1 to 12, and in some embodiments 4 to 7.5. In some embodiments, the range for Degrees Brix can be between 7 and 7.5. Soluble solids exert osmotic pressure on the micro-organisms during fermentation. A solution containing low soluble solids will ferment faster compared to a solution with high soluble solids due to low osmotic pressure. Adjusting soluble solids to control the rate of fermentation is crucial in controlling the continuous fermentation process.

Additional nutrients could be added in step 202 to the source material liquid to supplement the existing macronutrients and micro-nutrients for the bacterial culture. Examples of macronutrients could be commonly used carbon and nitrogen sources. Carbon sources could be simple or complex sugars such as glucose, sucrose, starch etc. Nitrogen sources could be yeast extract, peptones, tryptones etc. Micronutrients could be mineral salts, vitamins etc.

Finally, in step 202, the pH of the source material liquid is adjusted to ensure proper conditions for the bacterial culture to convert nitrates to nitrites. For example, the pH of the source material liquid may be mildly acidic (for example, pH of about 5) to mildly basic (for example, pH of about 9). In some embodiments, the pH of the source material liquid may be essentially neutral, for example, between pH of 6 and pH of 7.

In step 203, which takes place in pasteurization module 103, the source material concentrate 101 which has been adjusted for pH, nitrate concentration, and Degrees Brix in step 202 is pasteurized to reduce the microbial load in the solution to avoid competing micro-organisms that can adversely affect the nitrate conversion process. The source material liquid may be heated to a temperature and for a time designed to kill bacterial contamination that can adversely affect the nitrate conversion process. In some embodiments, step 203 can be carried out in an ultra-high-temperature pasteurizer. In some embodiments, the source material liquid can be heated to a temperature above about 200 °F for 15 seconds, for example, above 250 °F for 1-2 seconds or longer.

In step 204, which takes place in fermentation module 104, the pasteurized source material liquid is fermented and the nitrates in the source material liquid are converted into nitrites using actively growing micro-organisms. To that end, the source material liquid in the fermenter is inoculated in step 204*a* from inoculation module 104*a*, with a microbial culture to initiate the nitrates to nitrites conversion.

Any micro-organism capable of converting nitrate to nitrite can be used in the process of the present disclosure. Suitable micro-organisms include, but are not limited to, yeast, fungi, and bacteria. The organism can include, but are not limited to, for example, *Escherichia coli, Rhodobacter sphaeroides, Paracoccus pantotrophus, Wautersia eutropha, Bradyrhizobium japonicum, Pseudomonas* spp., *Campylobacter jejunii, Wollinella succinogenes, Haemophylus influenzae, Shewanella oneidensis, Desulfitobacterium hafniense, Rhodobacter capsulatus, Klebsiella pneumoniae, Bacillus subtilis, Cyanobacteria* spp., *Synechococcus* spp., the genus *Haloferax, Haloarcula* spp., *Thermus thermophilus*, the Micrococcaceae family, including *Micrococcus* and *Staphylococcus*, Gram-positive cocci, including *Enterococcus, Lactococcus, Leuconostoc, Pediococcus, Streptococcus*, and *Staphylococcus*, and some lactic acid bacteria, *M. varians, S. carnosus, S. vitulinus, S. xylosus* or a combination thereof. Embodiments of the present disclosure are also envisaged, wherein the conversion of nitrate into nitrite is accomplished using a suitable enzyme preparation, typically a preparation comprising nitrate reductase.

The micro-organisms are held in the inoculation module 104*a* until they need to be added to the fermentation tank. Inoculation culture could be activated by hydrating a lyophilized culture or an actively growing culture in a growth media. The growth media could comprise of commonly used carbon and nitrogen sources in the fermentation industry for growing microorganisms and adjusted to the needs of the specific strain. Growth media could also be a plant material with substantial carbon and nitrogen source tailored for optimum growth rate. The culture in the inoculation module 104*a* can be stored at refrigeration temperature until it is ready to be inoculated in step 204*a*. In some embodiments, the culture from the inoculation module 104*a* is inoculated in step 204*a* into the nitrate containing source material while in the log-phase of bacterial growth for optimum performance.

In step 204, after activated micro-organisms are inoculated into the nitrate containing solution in step 204*a*, fermentation is allowed until the desired concentration of nitrate in the source material liquid has been converted to nitrite. In some embodiments, the fermentation may be allowed to proceed until all or essentially all nitrate has been converted. In some embodiments, the fermentation is allowed to proceed until at least between 85% and 95% of nitrate has been converted. In some embodiments, the fermentation is allowed to proceed until at least 85%, or at least 90%, or at least 95% of nitrates are converted to nitrites. The concentration of nitrate in the source material liquid is converted to nitrite at a desired conversion rate. In some embodiments, the desired conversion rate will be the maximum conversion rate for given conditions. The first harvest can be withdrawn once the desired concentration of nitrate in the source material liquid has been converted to nitrite. After that, in some embodiments, the harvest can take place at regular time intervals.

Once the nitrite concertation reaches a desired level, a portion of the fermented liquid can be withdrawn from the fermentation tank. Simultaneously, fresh source material liquid is fed to the fermentation tank to replace the withdrawn portion of the fermented liquid within a certain period of time by defining a feed rate. In some embodiments, the rate of adding fresh material is lower than the rate of harvesting. In some embodiments, the feed rate is adjusted based on the volume that has to be replenished, which is the same as the harvest amount, in a period of time. Because the micro-organisms in the fermentation tank have already adapted and at the highest conversion rate, the additional volume of the source material liquid is fermented at essentially the highest rate of nitrate to nitrite conversion.

In step 205, the withdrawn fermented liquid is transferred to an inactivation module 105 where the micro-organisms in the fermented liquid are deactivated. The micro-organisms can be inactivated in a variety of ways, for example, using heat, filtration, pH change etc. Inactivation ensures no further growth of microorganisms and possible depletion of nitrite. In some embodiments, a basic pH of 7.5-12 can be used to inactivate the micro-organisms.

In step 206, which takes place in pasteurization module 106, the fermented liquid is pasteurized to kill microorganisms. Pasteurization may be accomplished through an ultra-high-temperature pasteurizer or through other pasteurization techniques.

In step 207, which takes place in centrifugation module 206, the pasteurized fermented liquid is centrifuged to remove the inactivated micro-organisms and any insoluble solids in the fermented liquid. Removal may also take place through filtration.

In step 208, which takes place in fermentation module 108, the fermented liquid is passed through an evaporation process to produce a concentrate of the curing agent solids comprising nitrite. In some embodiments, the curing agent may remain as a liquid. In some embodiments, the concentration of nitrite is between 5,000 to 100,000 ppm. The concentrate may also be achieved using other concentration methods including centrifugal evaporator or reverse osmosis.

In step 209, which takes place in final processing module 109, the curing agent solids are further dried and subject to grinding to produce curing agent powder. Drying may be accomplished through vacuum tray drying, vacuum belt drying, freezer drying, spray drying, or other drying techniques. In some embodiments, the curing agent powder can then be blended with other preservatives, such as for example, salt. Finally, the product is packaged for the storage or shipment.

Figure 3:
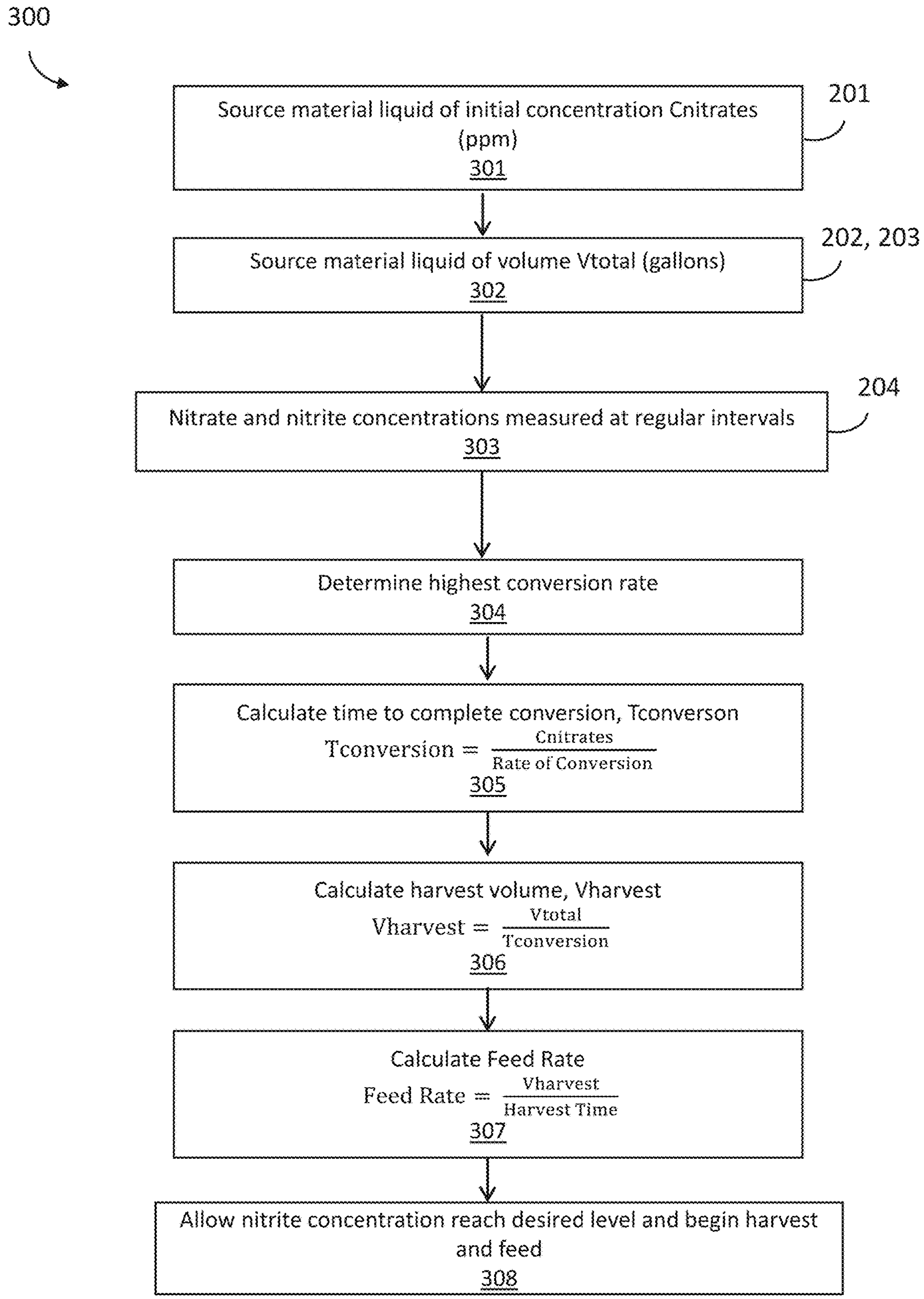
FIG. 3 provides an exemplary flow chart for carrying out the fermentation step on a continuous basis.

FIG. 3 provides an exemplary flow chart 300 for carrying out the fermentation step 204 on a continuous basis.

As discussed above, a volume of the source material liquid (Vtotal) 302 is supplied to the fermentation tank. The source material liquid can have an initial concentration of nitrates (Cnitrates) 301, which will be converted in the fermentation tank to a desired concentration of nitrites.

In a batch fermentation process, after the micro-organisms are added to the nitrate containing solution, the micro-organisms initially go through a lag phase, a 2 to 3 hour time period when the micro-organisms grow and get adapted to the fermentation medium (source material liquid). During the log phase of the microbial growth, nitrate to nitrite conversion rate increases exponentially over time with bacterial growth. Accordingly, depending on the concentration of nitrates in the source material liquid, it can typically take 6 to 10 hours for complete conversion of nitrate to nitrite, with most conversion happening in the last hour. After the nitrate to nitrite conversion is completed, the process is stopped by inactivating the micro-organism, and the process is repeated for a new batch of the micro-organisms and source material liquid.

The methods of the present disclosure advantageously eliminate, or at least significantly reduce, the initial lag phase, and instead utilize the highest conversion rate after the micro-organisms have reached the maximum growth during fermentation.

For example, the process is started by inoculating a first batch of the source material liquid with the microbial culture, step 204*a*. In some embodiments, inoculation of microbial culture may only occur in the first batch of source material liquid. The fermentation in step 204 is allowed until the desired concentration of nitrate in the source material liquid has been converted to nitrite. At this point in contrast to the batch process where the fermentation process is completely stopped, in the processes of the present disclosure, only a portion of the fermented liquid is withdrawn from the fermentation tank, and replenished with fresh source material liquid with additional nitrates so the fermentation process is allowed to continue in the remaining liquid.

In step 303, once the source material liquid is inoculated with the bacterial culture and fermentation begins, nitrate and nitrite concentrations are measured at desired time intervals. In some embodiments, concentrations may be measured at regular intervals between 10 and 60 minutes. In some embodiments, concentrations may be measured every 20 minutes. In some embodiments, the concentrations of nitrates and nitrites can be measured on a continuous basis.

In step 304, the highest conversion rate of nitrate to nitrite is determined. In some embodiments, nitrite and nitrate concentrations detected in step 303 can be plotted against time. The differential increase in conversion rate is measured and a prediction curve is used to estimate time of first harvest/transfer from the fermenter. The prediction curve can be generated by fitting the measured concentrations of nitrite or nitrate on the plot to the curve with the highest $R^2$ value. In some embodiments, the highest conversion rate is achieved in the last hour before complete conversion of nitrate to nitrite. In some embodiments, the rate of depletion of nitrate or the rate of increase in nitrite concentration can be used to determine conversion rate of nitrate to nitrite.

In step 305, highest conversion rate is used to determine estimated time for complete conversion.

In some embodiments, such time is calculated using the following formula:

$$T\text{conversion} = \frac{C\text{nitrates}}{\text{Rate of Conversion}}$$

Where Tconversion (for example, hours) is the time required for the complete conversion of nitrates in the source material liquid to nitrites at a certain conversion rate, Cnitrates is the initial concentration of nitrates (ppm) in the source material liquid, and Rate of Conversion (ppm per hour) is a desired rate (for example, maximum rate) of conversion of nitrates to nitrites by the microbial culture.

In step 306, the volume of harvest to be withdrawn at regular time intervals can be determined based on the nitrate concentration, Degrees Brix of the feed material, and time for complete conversion. In some embodiments, such volume is calculated using the following formula:

$$V\text{harvest} = \frac{V\text{total}}{T\text{conversion}}$$

Where Vharvest (gallons per hour) is the volume of harvest per unit time;

Vtotal (gallons) is the total volume of liquid in the fermentation tank; and

Tconversion (hour) is the time required for the complete conversion of nitrates in the source material liquid to nitrites at a certain conversion rate.

Higher nitrate concentration may require a smaller proportional harvest volume. In this manner, micro-organisms are left in in the fermenter to convert more nitrate to nitrite. In addition, this may provide more time for conversion of nitrates to nitrites to ensure that the product includes a desired concentration of nitrites. In addition, when calculating the volume of the fermented source material to be harvested at a regular time interval in step 306, the rate of the nitrates to nitrites conversion is also taken into an account.

In step 307, feed rate is determined from the withdrawn harvest volume and harvest time. In some embodiments, the feed rate is calculated so that the withdrawn volume is replaced by the end of the time interval. In some embodiments, such feed rate is calculated using the following formula:

$$\text{Feed Rate} = \frac{V\text{harvest}}{\text{Harvest Time}}$$

Where Feed Rate (gallons per minute) is the rate of fresh feed required to replenish the volume of harvest, Vharvest (gallons per hour) is the volume of harvest per unit time, and Harvest Time (hour) is a desired length of time between harvests.

In some embodiments, regular time intervals to harvest fermented liquid may be adjusted to be longer to protect downstream process equipment. In some embodiments the desired time interval can be between 30 minutes and 2 hours. In some embodiments, the harvest can be withdrawn every 1 hour to 1.5 hours. At longer time intervals, the harvest volume to be withdrawn is greater. As fermented liquid is harvested, fresh source material liquid is simultaneously fed to the fermentation tank to replace the withdrawn portion of the fermented liquid within a certain period of time.

In step 308, in some embodiments, concentration measurements can be taken during fermentation to predict when the complete conversion of nitrate to nitrite will occur. The first harvest is withdrawn once the desired concentration of nitrate in the source material liquid has been converted to nitrite. In some embodiments, the nitrite concentration may be allowed to reach a steady state at a desired concentration range before the first harvest is withdrawn. After that, the harvest can take place at regular time intervals. Simultaneously, fresh source material liquid is added to replace the harvested liquid.

As noted above, the rate of adding fresh material is lower than the rate of harvesting. In some embodiments, the feed rate is adjusted based on the volume that has to be replenished, which is the same as the harvest amount, in a period of time. Because the micro-organisms in the fermentation tank have already adapted and at the highest conversion rate, the additional volume of the source material liquid is fermented at the highest rate of nitrate to nitrite conversion.

In some embodiments, to keep the fermentation at the highest conversion rate for the given conditions, one challenge is to balance the rate of withdrawal of the fermented liquid with the rate of adding the source material liquid or the rate of replenishing the microbial culture in the fermentation tank, or both. For example, to maximize the rate of nitrate conversion, a sufficient number of adapted micro-organisms have to be present in the fermentation tank. In some embodiments, between about 7% and 90% of the fermented liquid is withdrawn from the fermentation tank. In some embodiments, between about 20% and 80% of the fermented liquid is withdrawn from the fermentation tank. In some embodiments, between about 40% and 60% of the fermented liquid is withdrawn from the fermentation tank. In some embodiments, the harvest volume may be less than 50% of the fermentation tank volume. In some embodiments, at least 30% of the micro-organisms remain in the fermentation tank. In some embodiments, at least 40% of the micro-organisms remain in the fermentation tank. In some embodiments, at least 50% of the micro-organisms remain in the fermentation tank.

In some embodiments, harvest volume can be kept constant while the frequency of harvest can be varied depending on the speed of conversion of nitrate to nitrite. When the complete conversion of nitrate to nitrite is reached, a predetermined amount can be harvested and fresh feed containing nitrates is fed to the fermentation tank. Frequency of fermentation can be $$F\text{harvest} = \frac{C\text{nitrates}}{\text{Rate of Conversion}} * \frac{V\text{harvest}}{V\text{total}}$$

In some embodiments, the fermented liquid is withdrawn and is replaced at a rate that is substantially equal to the growth rate of the micro-organisms in the fermentation tank. Liquid is fed to the fermenter gradually at a defined feed rate. However, the withdrawal of liquid is accomplished as fast as possible. In some embodiments, the withdrawal is accomplished in 2 to 10 minutes, and in some embodiments within 2 to 5 minutes. In this manner, unconverted nitrates from the feed liquid will not be harvested, which is undesirable. Withdrawal can be done at a fast speed to minimize the loss of nitrates in harvest. In some embodiments, the rate of the withdrawal is between 3 to 100 times faster than the rate of feed into the fermenter. In some embodiments, the withdrawal rate is 5 to 50 times faster than the rate of feed into the fermenter. In some embodiments, the withdrawal rate is 10 to 20 times faster than the rate of feed into the fermenter. In some embodiments, the withdrawal rate is at least 5 times, 10 times, 15 times, 20 times, 25 times, 30 times or 35 times faster than the rate of feed into the fermenter. For example, while a volume of the fermented liquid is harvested within 5 minutes, the same volume of the material source liquid is replenished over at least 1 hour.

Figure 4:
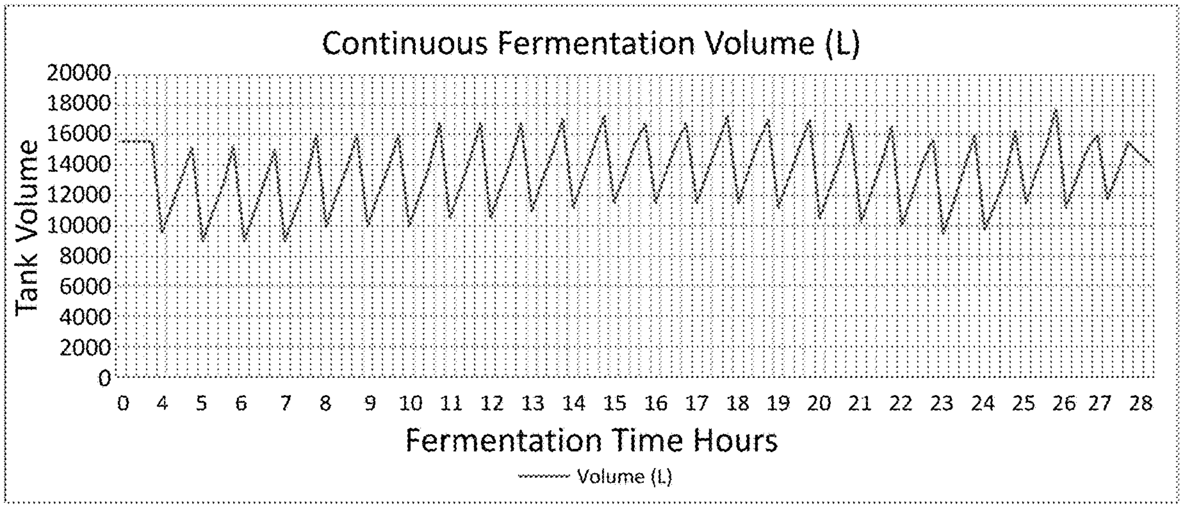
FIG. 4 is a graph showing an exemplary feed rate and harvest rate so that the volume of fresh feed equals the volume of harvest.

FIG. 4 is a graph 400 showing an exemplary feed rate and harvest rate so that the volume of fresh feed equals the volume of harvest. After reaching a desired conversion level or desired nitrite concentration, a portion of the fermentation liquid is withdrawn to undergo additional processing. Withdrawal occurs at a desired time interval. In graph 400, withdrawal occurred every hour but may occur at more frequent or less frequent time intervals. Simultaneously, fresh source material liquid is fed to the fermentation tank to replace the withdrawn portion of the fermented liquid within a certain period of time. As shown in graph 400, the rate of harvest is faster than the feed rate.

Figure 5:
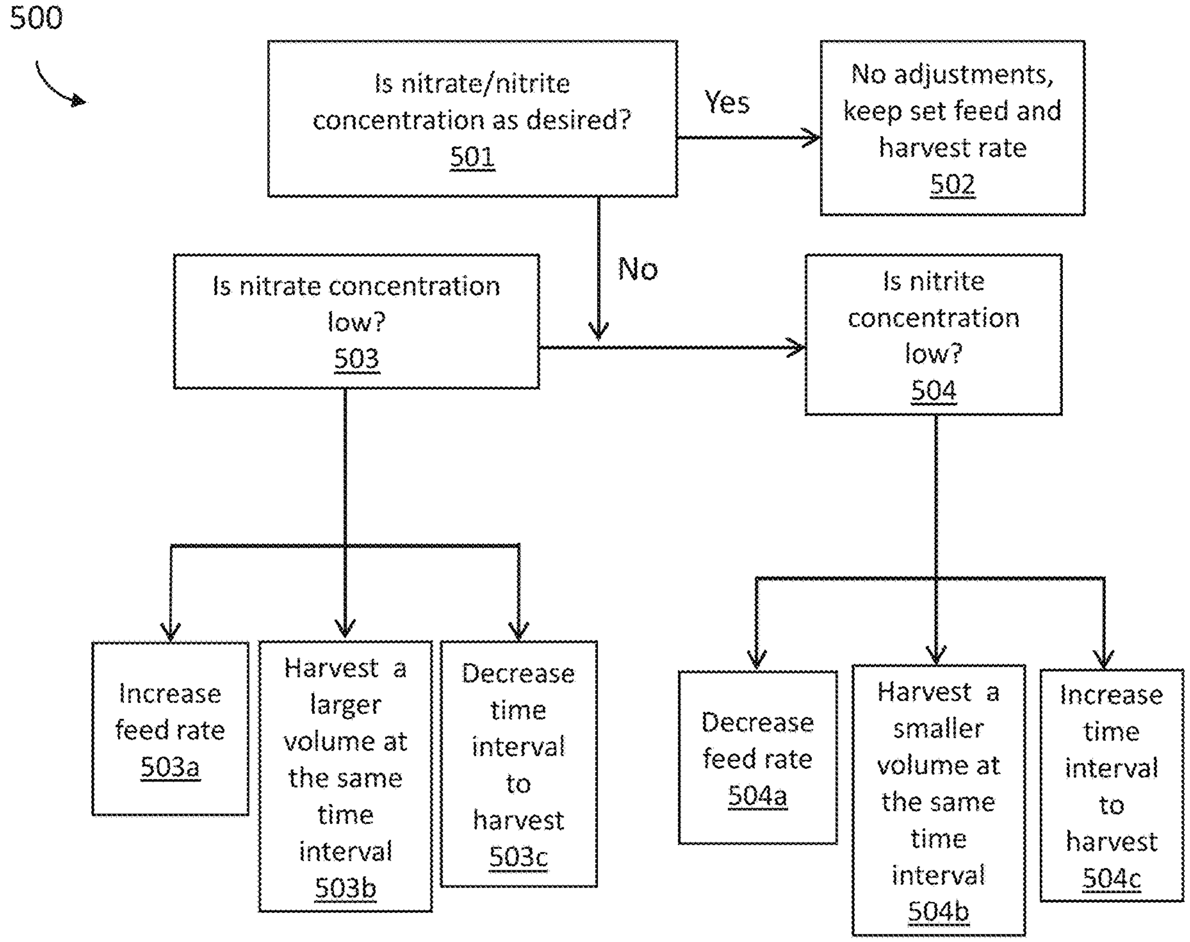
FIG. 5 provides a flow chart for an exemplary feedback loop to control the continuous fermentation process.

FIG. 5 provides an exemplary process flow chart 500 for a feedback loop to control the continuous fermentation process.

In some embodiments, at desired feed and harvest rates, the volume of fresh feed equals the volume of harvest. In such state, the concentrations of nitrate and nitrite measured at regular time intervals, are at desired concentrations. Adjustments to feed rate, harvest volume, and harvest time are based on the concentrations of nitrate and nitrite measured at regular time intervals. In some embodiments, the process of the present disclosure includes a feedback loop to ensure the harvest includes a desired concentration of nitrites and nitrates. For example, the feedback loop is used to ensure that all or essentially all nitrate has been converted, and so the harvest includes no or minimal nitrates and a desired concentration of nitrites, as discuss above.

If nitrate or nitrite concentrations are at desired levels 501, no adjustments are required, and the set feed rate and harvest rate are maintained, 502. If the nitrate concentration is too low 503, too much fermented liquid will remain in the tank and not enough feed will enter the tank. In some embodiments, the concentration of nitrates may be zero, and microorganisms will start to convert nitrite into nitrous oxide. To combat this, fresh nitrates can be supplied to the fermentation tank. To achieve this, feed rate may be increased 503*a*, a larger volume of fermented liquid may be harvested at the same time interval 503*b*, or the time interval between harvests may be decreased 503*c*. If the nitrite concentration is too low 504, not enough fermented liquid with activated micro-organisms will remain in the tank and too much feed will enter the tank. Micro-organisms will under convert nitrate to nitrite. To combat this, feed rate may be decreased 504*a*, a smaller volume of fermented liquid may be harvested at the same time interval 504*b*, or the time interval between harvests may be increased 504*c*.

In some embodiments, the time to a desired level of conversion may be monitored and if there is a change in that time, the rate of feed of the fresh source material liquid, timing of harvest, or both can be changed to ensure a desired level of conversion of nitrates to nitrites. In some embodiments, the conversion time may change due to a change in the number or activity level of the microorganism.

In some embodiments, the conversion time may change due to a change in the initial nitrate concentration in the fresh material source liquid. In some embodiments, the harvested liquid includes no nitrates, as all nitrates have been converted during the fermentation process.

Figure 10:
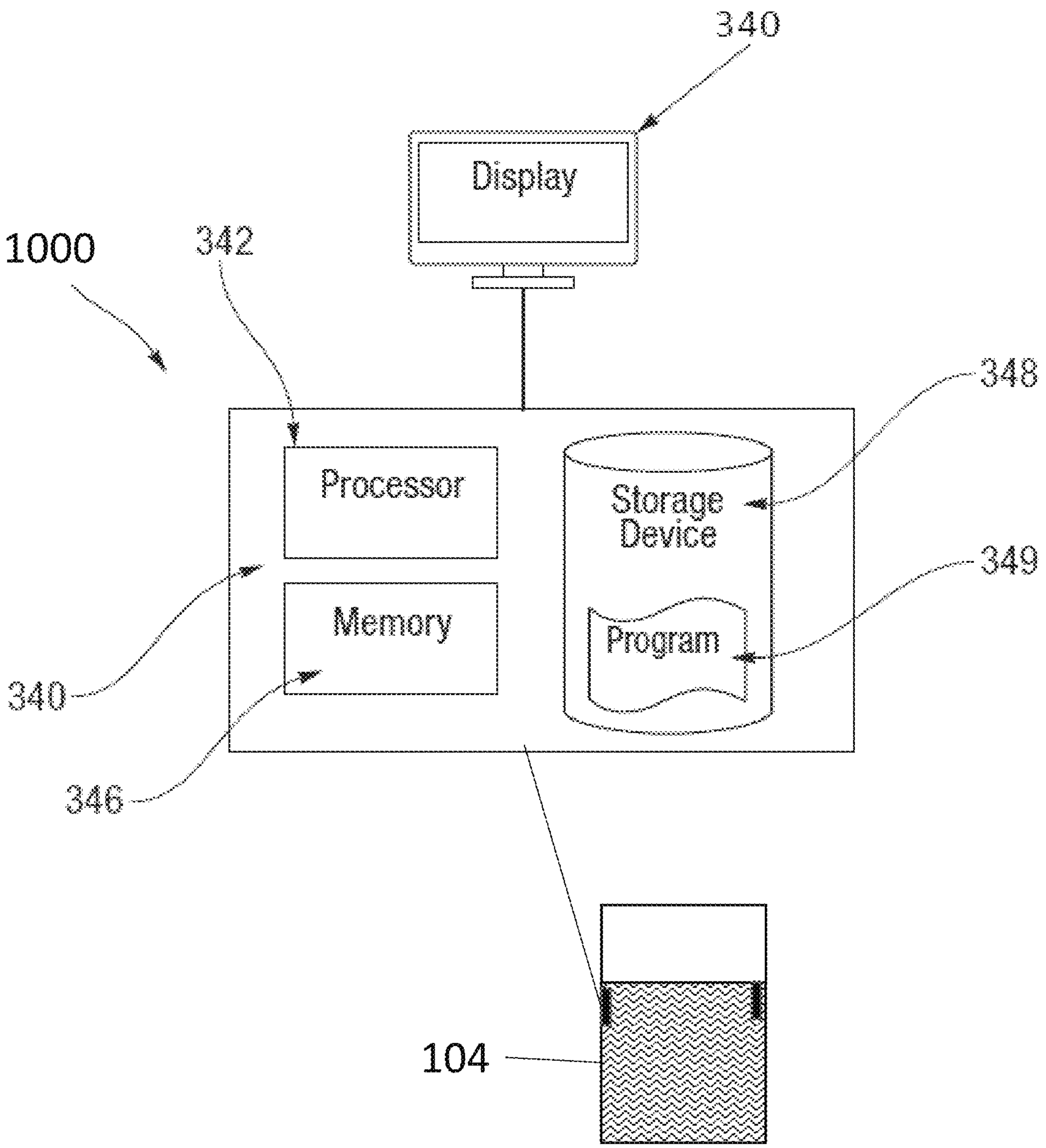
FIG. 10 illustrates an exemplary computer system suitable for use in connection with the systems and methods of the present disclosure.

In reference to FIG. 10, in some embodiments, an automated system for continuous fermentation of plant-based nitrates is provided. In some embodiments, as discussed above, conversion data may be collected to monitor conversion of the nitrates to nitrites, when the source material liquid is inoculated with a bacterial culture capable of converting nitrates to nitrites. For example, the conversion data includes the concentration of nitrate and the concentration of nitrite in the source material liquid over time. In some embodiments, the conversion data may be collected using on-line one or more sensors or off line, such as for, example, taking a sample from the fermentation tank and testing the sample using an HPLC. The conversion data can be communicated to a computer system 1000, in particular, a processor 342, that is programed to perform one or more steps of the methods described above. For example, the processor may be programmed to receive the conversion data; when nitrites in the source material liquid reach a desired concentration, cause a first harvest volume of the source material liquid to be harvested at a harvest rate; and cause the harvested volume of the source material liquid to be replenished with source material liquid comprising additional nitrates at a feed rate, wherein the harvest rate is higher than the feed rate. In some embodiments, the processor can also be programed to determine a rate of conversion of nitrates to nitrites; calculate a time for desired conversion (Tconversion) of nitrates to nitrites based on an initial concentration of nitrates in the source material liquid and the rate of conversion; calculate the harvest volume based on a total volume of the source material liquid and Tconversion; and calculate the feed rate based on the harvest volume and a harvest time.

FIG. 10 shows, by way of example, a diagram of a typical processing architecture for the computer system 1000, which may be used in connection with the methods and systems of the present disclosure. A computer processing device 340 can be coupled to display 341 for graphical output. Processor 342 can be a computer processor 342 capable of executing software. Typical examples can be computer processors (such as Intel® or AMD® processors), ASICS, microprocessors, and the like. Processor 342 can be coupled to memory 346, which can be typically a volatile RAM memory for storing instructions and data while processor 342 executes. Processor 342 may also be coupled to storage device 348, which can be a non-volatile storage medium, such as a hard drive, FLASH drive, tape drive, DVDROM, or similar device. Although not shown, computer processing device 340 typically includes various forms of input and output. The I/O may include network adapters, USB adapters, Bluetooth radios, mice, keyboards, touchpads, displays, touch screens, LEDs, vibration devices, speakers, microphones, sensors, or any other input or output device for use with computer processing device 340. Processor 342 may also be coupled to other types of computer-readable media, including, but not limited to, an electronic, optical, magnetic, or other storage or transmission device capable of providing a processor, such as the processor 342, with computer-readable instructions. Various other forms of computer-readable media can transmit or carry instructions to a computer, including a router, private or public network, or other transmission device or channel, both wired and wireless. The instructions may comprise code from any computer-programming language, including, for example, C, C++, C #, Visual Basic, Java, Python, Perl, and JavaScript.

Program 349 can be a computer program or computer readable code containing instructions and/or data and can be stored on storage device 348. The instructions may comprise code from any computer-programming language, including, for example, C, C++, C #, Visual Basic, Java, Python, Perl, and JavaScript. In a typical scenario, processor 342 may load some or all of the instructions and/or data of program 349 into memory 346 for execution. Program 349 can be any computer program or process including, but not limited to web browser, browser application, address registration process, application, or any other computer application or process. Program 349 may include various instructions and subroutines, which, when loaded into memory 346 and executed by processor 342 cause processor 342 to perform various operations, some or all of which may effectuate the methods for managing medical care disclosed herein. The program 349 may be stored on any type of non-transitory computer readable medium, such as, without limitation, hard drive, removable drive, CD, DVD or any other type of computer-readable media.

Further details of the present disclosure are illustrated by the following non-limiting Examples. These examples are put forth so as to provide those of ordinary skill in the art with a complete present disclosure and description of how to make and use the compositions and methods of the present disclosure, and are not intended to limit the scope of what the inventors regard as their present disclosure.

Example 1—Celery Concentrate with 40,000 ppm Nitrate (Dry Basis)

Figure 6:
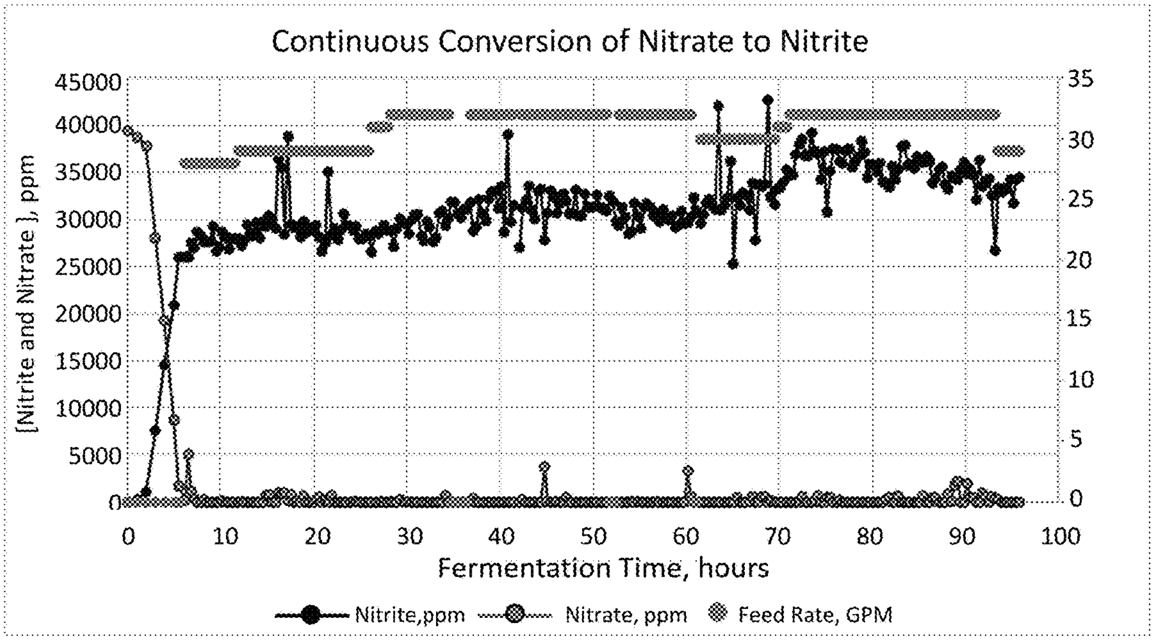
FIG. 6 is a graph showing the continuous conversion of nitrate to nitrite, using a starting material containing 40,000 ppm nitrate (dry basis) according to some embodiments of the present disclosure.

FIG. 6 is a graph 600 showing the continuous conversion of nitrate to nitrite, using a starting material containing 40,000 ppm nitrate (dry basis) according to some embodiments of the present disclosure. Nitrite concentration 601, nitrate concentration 602, and feed rate (gallons per minute) 603, are shown. After reaching an optimal conversion level, a portion of the fermentation liquid is withdrawn to undergo additional processing. Simultaneously, fresh source material liquid is fed to the fermentation tank to replace the withdrawn portion of the fermented liquid within a certain period of time.

Graph 600 shows celery concentrate at 45 Degrees Brix (soluble solids) with 40,000 ppm nitrate on dry basis is diluted to 7 Degrees Brix using water and pH adjusted to 4.8-7.5 using food grade sodium hydroxide. Diluted celery juice (3,500 gallons) is processed through an ultra-high temperature pasteurizer and fed into fermenter. Actively growing culture of *Staphylococcus carnosus* in log phase was used to inoculate celery juice at 37 °C. Nitrate and nitrite were measured every hour to get percent conversion of nitrate to nitrite. Concentration of nitrite was plotted against time. Time of complete conversion of nitrate to nitrite was predicted by fitting a curve with highest $R^2$. Conversion rate of nitrate to nitrite in the last hour (highest rate) was determined to be approximately 20,000 ppm nitrate per hour (dry basis). Time required for complete conversion at 20,000 ppm/hr conversion rate is determined to be 2 hours by dividing the 40,000 ppm nitrate by 20,000 ppm/hour. Harvest volume is determined by dividing the fermentation volume by 2 hours giving a 1,750 gallon harvest every hour. Feed rate is determined by dividing 1,750 gallons by 60 minutes as 29 gallons per minute. Harvest is done at much faster rate preferably over 400 gallons per minute. As shown in FIG. 6, a continuous process was achieved for approximately 95 hours at a feed rate of 28-32 gallons/min. Approximately 90 harvests of 1,750 gallons of fermented celery juice resulted in 166,000 gallons of product which would otherwise require 45 batch fermentations at 5 hours per fermentation (as shown in FIG. 7).

Figure 7:
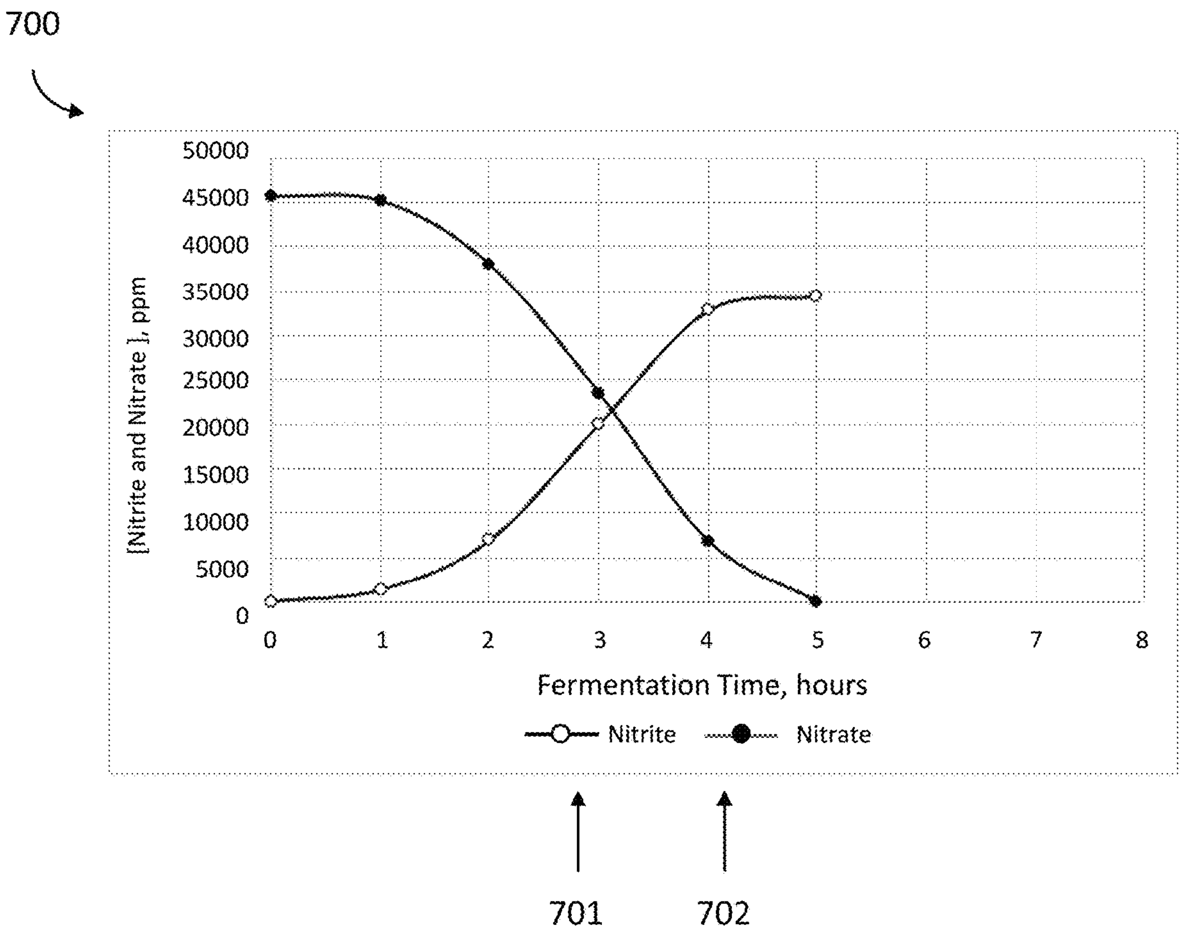
FIG. 7 is a graph showing the concentration of nitrate and nitrite (dry basis) using a starting material containing approximately 40,000 ppm nitrate (dry basis) in batch fermentation as a function of time according to some embodiments of the present disclosure.

FIG. 7 is a graph 700 showing the concentration of nitrate and nitrite (dry basis) using a starting material containing approximately 40,000 ppm nitrate (dry basis) in batch fermentation as a function of time according to some embodiments of the present disclosure. Nitrite concentration 701 and nitrate concentration 702 is shown.

Example 2—Celery Concentrate with 70,000 ppm Nitrate (Dry Basis)

Figure 8:
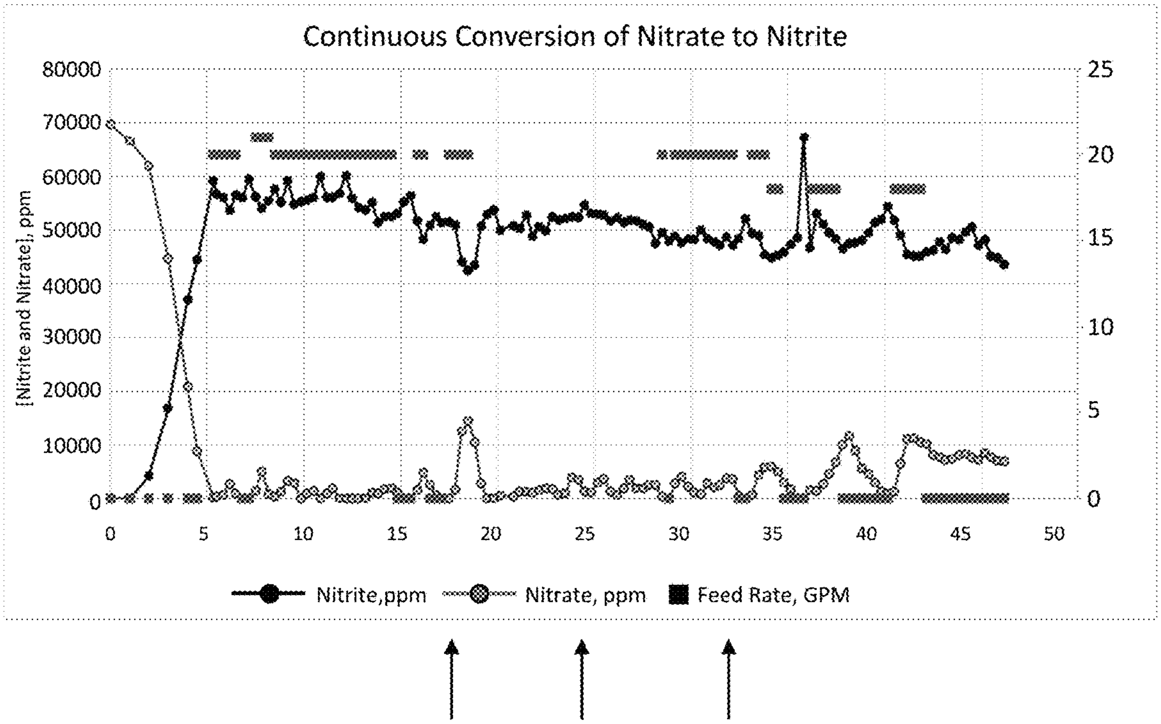
FIG. 8 is a graph showing the continuous conversion of nitrate to nitrite, using a starting material containing 70,000 ppm nitrate (dry basis) according to some embodiments of the present disclosure.

FIG. 8 is a graph 800 showing the continuous conversion of nitrate to nitrite, using a starting material containing 70,000 ppm nitrate (dry basis) according to some embodiments of the present disclosure. Nitrite concentration 801, nitrate concentration 802, and feed rate (gallons per minute) 803, are shown. After reaching an optimal conversion level, a portion of the fermentation liquid is withdrawn to undergo additional processing. Simultaneously, fresh source material liquid is fed to the fermentation tank to replace the withdrawn portion of the fermented liquid within a certain period of time.

Graph 800 shows celery concentrate at 45 Degrees Brix (soluble solids) with 70,000 ppm nitrate on dry basis is diluted to 7 Degrees Brix using water and pH adjusted to 4.8-7.5 using food grade sodium hydroxide. Diluted celery juice (3,500 gallons) is processed through an ultra-high temperature pasteurizer and fed into fermenter. Actively growing culture of *Staphylococcus carnosus* in log phase was used to inoculate celery juice at 37 °C. Nitrate and nitrite were measured every hour to get percent conversion of nitrate to nitrite. Concentration of nitrite was plotted against time. Time of complete conversion of nitrate to nitrite was predicted by fitting a curve with highest $R^2$. Conversion rate of nitrate to nitrite in the last hour (highest rate) was determined to be approximately 23,500 ppm nitrate per hour (dry basis). Time required for complete conversion at 23,500 ppm/hr conversion rate is determined to be approximately 3 hours by dividing the 70,000 ppm nitrate by 23,500 ppm/hour. Harvest volume is determined by dividing the fermentation volume by 3 hours giving a 1,167 gallon harvest every hour. Harvests were done every 1.5 hours (90 minutes) to ensure downstream processing equipment were not affected adversely. Therefore at 90 minute intervals, harvest volume was set at 1,750 gallons. Feed rate is determined by dividing 1750 gallons by 90 minutes as approximately 20 gallons per minute. Harvest is done at much faster rate preferably over 400 gallons per minute. As shown in FIG. 8, a continuous process was achieved for approximately 46 hours at a feed rate of 18-21 gallons/min. Approximately 26 harvests of 1,750 gallons of fermented celery juice resulted in 45,500 gallons of product which would otherwise require 13 batch fermentations at 7.5 hours per fermentation (as shown in FIG. 9).

Figure 9:
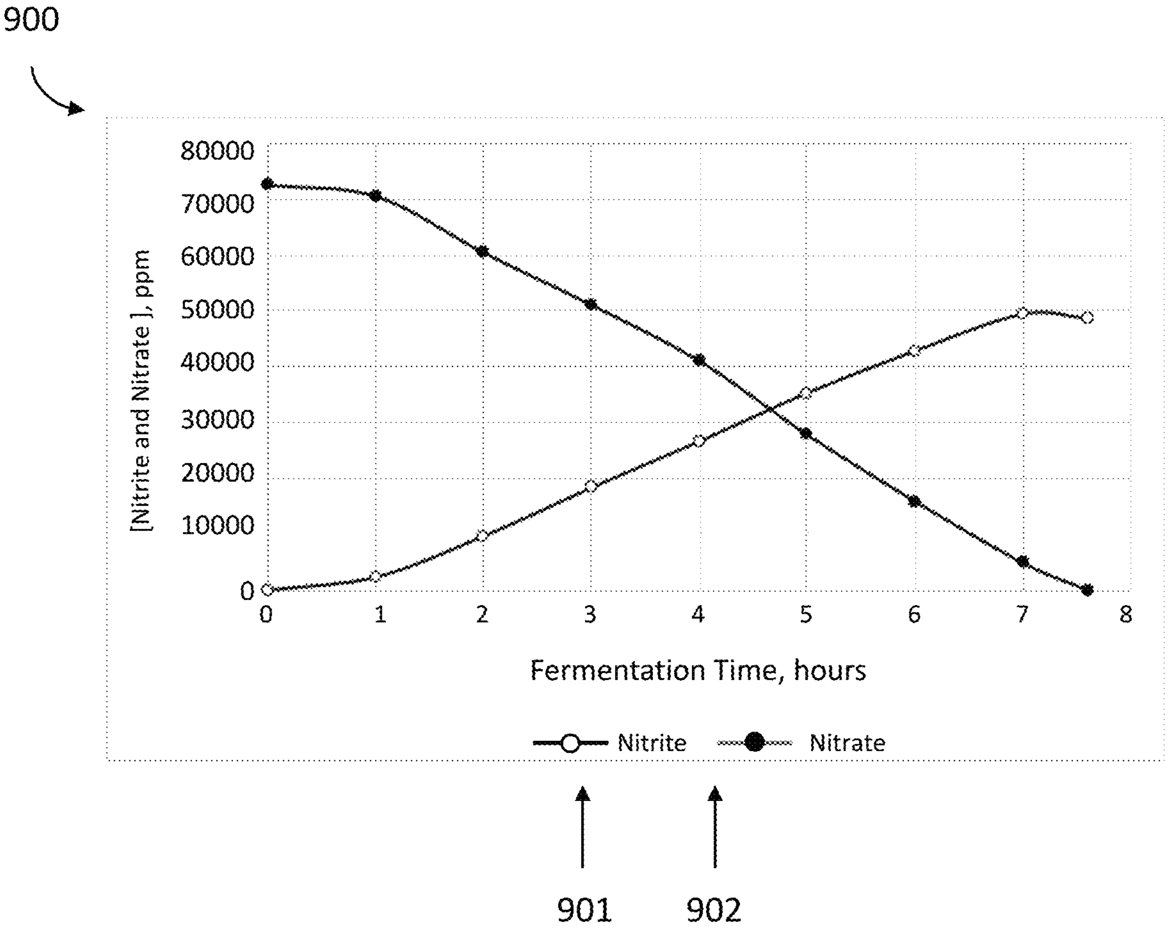
FIG. 9 is a graph showing the concentration of nitrate and nitrite (dry basis) using a starting material containing approximately 70,000 ppm nitrate (dry basis) in batch fermentation as a function of time according to come embodiments of the present disclosure.

FIG. 9 is a graph 900 showing the concentration of nitrate and nitrite (dry basis) using a starting material containing approximately 70,000 ppm nitrate (dry basis) in batch fermentation as a function of time according to come embodiments of the present disclosure. Nitrite concentration 901 and nitrate concentration 902 is shown.

The curing agents produced by the methods of the present disclosure may comprise an amount of nitrite for curing various meats, such as beef, pork, turkey, chicken, products, from such meats, as well as seafood and seafood products. In some embodiments, the curing agents of the present disclosure can be used with organic or all-natural meats, poultry or seafood. The curing agents of the present disclosure have a nitrite concentration sufficient for curing various meats or seafood products. For example, the curing agents of the present disclosure may have a nitrite concentration of at least 100 ppm. at least 1,000 ppm, at least 10,000 ppm or at least 20,000 ppm. In some embodiments, the concentration of nitrites may be between 20,000 ppm and 140,000 ppm. The curing agents of the present disclosure may be combined with other meat curing products, such as, for example, sea salt. The curing agents of the present disclosure may be in liquid or powder form.

In some embodiments, a method of preserving a meat, poultry, or seafood product comprises contacting a meat or sea food product to be preserved with the curing agent of the present disclosure. In some embodiments, a cured meat or a seafood product is provided, wherein such product has been contacted with a curing agent of the present disclosure.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the present disclosure. It is intended that the present disclosure be limited only to the extent required by the appended claims and the applicable rules of law.

It is also to be understood that the following claims are to cover all generic and specific features of the present disclosure described herein, and all statements of the scope of the present disclosure which, as a matter of language, might be said to fall therebetween.

What is claimed is:

1. A system comprising:

a fermentation tank configured to hold a source material liquid comprising an initial concentration of plant-based nitrates, the fermentation tank having an inlet configured to provide the source material liquid to the fermentation tank and outlet configured to withdraw the source material liquid from the fermentation tank;

a processor being programmed to continuously:

receive a conversion data to monitor conversion of the plant-based nitrates to nitrites with a bacterial culture;

when the initial concentration of plant-based nitrites in the source material liquid increases to a desired concentration, cause a first harvest volume of the source material liquid to be harvested at a harvest rate; and cause the first harvest volume of the source material liquid to be replenished with the source material liquid comprising additional plant-based nitrates at a feed rate, wherein the harvest rate is higher than the feed rate.

2. The system of claim 1, wherein the processor is further programmed to:

determine a rate of conversion of plant-based nitrates to nitrites;

calculate a time for desired conversion (Tconversion) of plant-based nitrates to nitrites based on an initial concentration of plant-based nitrates in the source material liquid and the rate of conversion;

calculate the first harvest volume based on a total volume of the source material liquid and T conversion; and calculate the feed rate based on the first harvest volume and a harvest time.

3. The system of claim 1, wherein the processor is further programmed, if a concentration of plant-based nitrates in the first harvest volume is lower than the desired concentration of nitrites, to cause a decrease in the feed rate, cause a decrease in the first harvest volume, or cause an increase in harvest time.

4. The system of claim 2, wherein the processor is further programmed to cause an adjustment in one or more of the first harvest volume, harvest rate and feed rate to maintain a maximum conversion rate of plant-based nitrates to nitrites.

5. The system of claim 1, wherein the processor is further programmed to determine a rate of conversion of plant-based nitrates to nitrites and cause an allowance of the rate of conversion to become a maximum conversion rate of plant-based nitrates to nitrites for the bacterial culture before harvesting a first harvest volume.

6. The system of claim 1, wherein the harvest rate is between 5 and 50 times faster than the feed rate.

7. The system of claim 1, wherein the first harvest volume is between 40 and 60% of an initial volume of the source material liquid.

8. A system for continuous production of a curing agent, the system comprising:

a fermentation tank configured to hold a source material liquid comprising plant-based nitrates, the fermentation tank having an inlet configured to provide the source material liquid to the fermentation tank and outlet configured to withdraw the source material liquid from the fermentation tank;

a processor being programmed to continuously:

receive a conversion data to monitor conversion of plant-based nitrates in a source material liquid to nitrites using a bacterial culture;

when the nitrites in the source material liquid reach a desired concentration, cause a first harvest volume of the source material liquid to be harvested at a harvest rate; and cause the first harvest volume of the source material liquid to be replenished with additional source material liquid comprising additional plant-based nitrates at a feed rate, wherein the harvest rate is between 3 and 100 times faster than the feed rate.

9. The system of claim 8, wherein the processor is further programmed to:

determine a rate of conversion of plant-based nitrates to nitrites;

calculate a time for desired conversion (Tconversion) of plant-based nitrates to nitrites based on an initial concentration of plant-based nitrates in the source material liquid and the rate of conversion;

calculate the first harvest volume based on a total volume of the source material liquid and T conversion; and calculate the feed rate based on the first harvest volume and a harvest time.

10. The system of claim 8, wherein the processor is further programmed, if a concentration of plant-based nitrates in the first harvest volume is lower than the desired concentration of nitrites, to cause a decrease in the feed rate, cause a decrease in the first harvest volume, or cause an increase in harvest time.

11. The system of claim 9, wherein the processor is further programmed to cause an adjustment in one or more of the first harvest volume, harvest rate and feed rate to maintain a maximum conversion rate of plant-based nitrates to nitrites.

12. The system of claim 8, wherein the processor is further programmed to determine a rate of conversion of plant-based nitrates to nitrites and cause an allowance of the rate of conversion to become a maximum conversion rate of plant-based nitrates to nitrites for the bacterial culture before harvesting a first harvest volume.

13. The system of claim 8, wherein the harvest rate is between 5 and 50 times faster than the feed rate.

14. The system of claim 8, wherein the first harvest volume is such that at least 30% of the bacterial culture remains in the source material liquid.

15. The system of claim 8, wherein the first harvest volume is between 40 and 60% of an initial volume of the source material liquid.

16. A system for continuous production of a curing agent, the system comprising:

a fermentation tank configured to hold a source material liquid comprising plant-based nitrates, the fermentation tank having an inlet configured to provide the source material liquid to the fermentation tank and outlet configured to withdraw the source material liquid from the fermentation tank;

a processor being programmed to continuously:

receive a conversion data to monitor conversion of plant-based nitrates in a source material liquid to nitrites using a bacterial culture;

when the nitrites in the source material liquid reach a desired concentration, cause a first harvest volume of the source material liquid to be harvested at a harvest rate; and cause the first harvest volume of the source material liquid to be replenished with additional source material liquid comprising additional plant-based nitrates at a feed rate, wherein the harvest rate is higher than the feed rate, and wherein the first harvest volume is such that at least 30% of the bacterial culture remains in the source material liquid.

17. The system of claim 16, wherein the processor is further programmed to:

determine a rate of conversion of plant-based nitrates to nitrites;

calculate a time for desired conversion (Tconversion) of plant-based nitrates to nitrites based on an initial concentration of plant-based nitrates in the source material liquid and the rate of conversion;

calculate the first harvest volume based on a total volume of the source material liquid and T conversion; and calculate the feed rate based on the first harvest volume and a harvest time.

18. The system of claim 16, wherein the processor is further programmed, if a concentration of plant-based nitrates in the first harvest volume is lower than the desired concentration of nitrites, to cause a decrease in the feed rate, cause a decrease in the first harvest volume, or cause an increase in harvest time.

19. The system of claim 17, wherein the processor is further programmed to cause an adjustment in one or more of the first harvest volume, harvest rate and feed rate to maintain a maximum conversion rate of plant-based nitrates to nitrites.

20. The system of claim 16, wherein the processor is further programmed to determine a rate of conversion of plant-based nitrates to nitrites and cause an allowance of the rate of conversion to become a maximum conversion rate of plant-based nitrates to nitrites for the bacterial culture before harvesting a first harvest volume.

21. The system of claim 16, wherein the harvest rate is between 5 and 50 times faster than the feed rate.

22. The system of claim 16, wherein the first harvest volume is between 40 and 60% of an initial volume of the source material liquid.

23. The system of claim 16, wherein the harvest rate is based on the feed rate, a rate of replenishing the bacterial culture, or a combination thereof.

* * * * *